United States Patent [19]

Kelley et al.

[11] Patent Number: 5,653,147

[45] Date of Patent: Aug. 5, 1997

[54] EXPANDABLE RETAINER FOR CONDUIT END FITTING

[75] Inventors: Larry W. Kelley, Troy; Edward C. Simon, Garden City, both of Mich.

[73] Assignee: Teleflex Incorporated, Plymouth Meeting, Pa.

[21] Appl. No.: 513,447

[22] Filed: Aug. 10, 1995

[51] Int. Cl.$^6$ ....................................... F16C 1/10
[52] U.S. Cl. .................. 74/502.4; 403/197; 248/56
[58] Field of Search .................. 74/502.4, 502.6; 403/197, 194, 201; 248/56; 16/2

[56] References Cited

U.S. PATENT DOCUMENTS

| | | |
|---|---|---|
| 2,937,834 | 5/1960 | Orenick et al. . |
| 3,164,054 | 1/1965 | Biesecker . |
| 3,285,551 | 11/1966 | Tschanz . |
| 3,788,655 | 1/1974 | Hathaway ................................. 16/2 X |
| 3,875,843 | 4/1975 | Maeda et al. . |
| 4,261,221 | 4/1981 | Kobayashi . |
| 4,304,148 | 12/1981 | Hamman ................................. 74/502.4 |
| 4,304,149 | 12/1981 | Heimann ................................. 74/502.4 |
| 4,324,503 | 4/1982 | Sevrence . |
| 4,333,361 | 6/1982 | Spease . |
| 4,657,212 | 4/1987 | Gilmore et al. . |
| 4,773,280 | 9/1988 | Baumgarten . |
| 4,963,050 | 10/1990 | Wendt et al. . |
| 5,257,548 | 11/1993 | Pardy . |

FOREIGN PATENT DOCUMENTS

| | | | |
|---|---|---|---|
| 2 532 381 | 3/1984 | France | ................................. 74/502.4 |
| 2314598 | 3/1973 | Germany . | |
| 790819 | 2/1958 | United Kingdom . | |
| 2081411 | 2/1982 | United Kingdom . | |

Primary Examiner—Charles A. Marmor
Assistant Examiner—MaryAnn Battista
Attorney, Agent, or Firm—Howard & Howard

[57] ABSTRACT

A motion transmitting remote control assembly (10) includes a flexible tubular conduit (12) and a flexible core element (14) slidably disposed in the conduit (12). An end fitting (18) is molded about one end of the conduit (12) and includes an expander tip (20) with a tip rib (22). An expandable retainer (28) having a collar (34) and cantilever legs (36) extending from the collar (34), is disposed about the end fitting (18). Wedge surfaces (42) internally of the legs (36) react against the expander tip (20) and the tip rib (22) of the end fitting (18) to blossom outwardly into gripping engagement with the edges of a hole (30) in a support bracket (32). The fully-blossomed and expanded legs (36) seat behind the tip rib (22) to lock the retainer (28) in place on the end fitting (18). A retainer rib (50) is disposed within the collar (34) and attaches the retainer (28) to the end fitting (18) in an unspread, preoperative position ready for subsequent expansion and attachment to the hole (30) in the support bracket (32).

11 Claims, 3 Drawing Sheets

EXPANDABLE RETAINER FOR CONDUIT END FITTING

TECHNICAL FIELD

The subject invention relates to a motion transmitting remote control of assembly of the type for transmitting motion along a curved path, and more particularly to a retainer for the end fitting of a conduit.

BACKGROUND OF THE INVENTION

Motion transmitting remote control assemblies of the type for transmitting motion in a curved path by means of a flexible motion transmitting core element are frequently used in applications to control the movement of a member from a remote location. For example, the air intake of an internal combustion engine, at the carburetor or throttle body, is typically controlled from a foot pedal in an automobile using a motion transmitting remote control assembly. Similarly, transmissions, vents, fuel doors, hood releases and the like typically employ a motion transmitting remote control assembly for affecting the desired mechanical movements from a remote actuating location. Such motion transmitting remote control assemblies often comprise a protective sheath-like conduit which slidably supports an internal moving core element. The conduit is retained in support brackets at each end to hold the remote control assembly in a routed path.

For relatively light duty applications, i.e., where the axial loads imposed on the conduit and its end fittings are not substantial or critical, the prior art has taught various embodiments of expandable retainers which quickly connect the end of the conduit to a hole in a thin-walled support bracket.

For example, German patent document no. 2314598, published Oct. 4, 1973, discloses a conduit end fitting with an expandable retainer for attaching to the hole in a thin-walled support bracket. An external rib is disposed about the tip of the end fitting and serves to attach the retainer to the end fitting prior to expansion and attachment to the hole in the support bracket. Cantilever, flexible legs of the expandable retainer snap in place behind the external rib on the tip of the end fitting in an unspread preoperative position prior to attachment to the support bracket. The retainer together with the end fitting is then forced through the hole in the support bracket. A lip on the retainer arrests further movement of the retainer, while the end fitting is pushed through the hole. This causes the cantilever legs of the retainer to blossom into tight gripping engagement with the edges of the hole in the support bracket. The primary disadvantage of this German expandable retainer is that once fully blossomed and locked in place, relatively light axial loads on the end fitting can cause the retainer to slip on the end fitting and disconnect from the support bracket.

Also, the European company Gills of England, manufactures an expandable retainer for an end fitting of a conduit. However, the Gills of England expandable retainer is not coupled to the end fitting prior to attachment to the support bracket, and therefore, is particularly prone to inadvertent disconnection and loss of the expandable retainer by installation personnel, such as during the fast-paced installation procedure on an assembly line.

SUMMARY OF THE INVENTION AND ADVANTAGES

The subject invention provides a motion transmitting remote control assembly of the type for transmitting motion along a curved path. The assembly comprises a flexible conduit having a pair of spaced apart ends, an end fitting is disposed on one of the ends of the conduit. The end fitting includes an expander tip. A flexible core element is slidably disposed in the conduit. An expandable retainer for attaching the end fitting to a hole in a thin-walled support bracket is provided. The expandable retainer has a collar surrounding the end fitting and a plurality of cantilever legs which extend from the collar. The legs each include an inwardly tapering wedge surface for reactively spreading the legs into gripping engagement with the hole in the support bracket in response to forcible advancement of the end fitting and the retainer into the hole in the support bracket. A coupling means is provided for attaching the retainer to the end fitting in an unspread preoperative position ready for subsequent expansion and attachment to the hole in the support bracket thereby preventing inadvertent disconnection and loss of the retainer and decreasing installation time of the remote control assembly. The coupling means includes an external tip rib disposed around the expander tip of the end fitting, and an internal retainer rib disposed within the retainer and engageable with the tip rib when the retainer and the end fitting are in an unspread preoperative position.

The coupling means of the subject invention, comprises an effective and simple method for coupling the expandable retainer and the end fitting prior to connection with the hole of the thin-walled support bracket. Furthermore, this particular combination of structural features provides an extremely secure connection with the support bracket, thereby permitting use of the assembly in medium to heavy load applications, as well as providing convenient serviceability by disconnection of the expandable retainer if necessary without damage to the retainer.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Referring to the Figures, wherein like numerals indicate like or corresponding parts throughout the several views, a motion transmitting remote control assembly is generally shown at 10. The assembly 10 is of the type including a flexible conduit, generally indicated at 12, having a pair of spaced apart ends. The conduit 12 is preferably of the composite type having an inner tubular liner defining the internal boundaries of a core passage, at least one metallic supportive lay wire wrapped helically about the liner, and an outer cover disposed about the lay wire. A flexible core element 14 is slidably disposed in the conduit 12. The core element 14 extends from both ends of the conduit 12 and attaches, respectively, to controlling and controlled members. For example, the controlling end of the core element 14 may be connected to an accelerator pedal, whereas the controlled end of the core element may be connected to the throttle valve in the engine compartment. A slug 16 is attached to the end of the core element 14 to facilitate connection to either the controlling or controlled members. Of course, those skilled in the art will appreciate other uses of a motion transmitting remote control assembly which includes a conduit 12 and a core element 14, and that many various alternative configurations of the preferred embodiment disclosed herein are possible without departing from the invention as defined in the appended claims.

Figure 1:
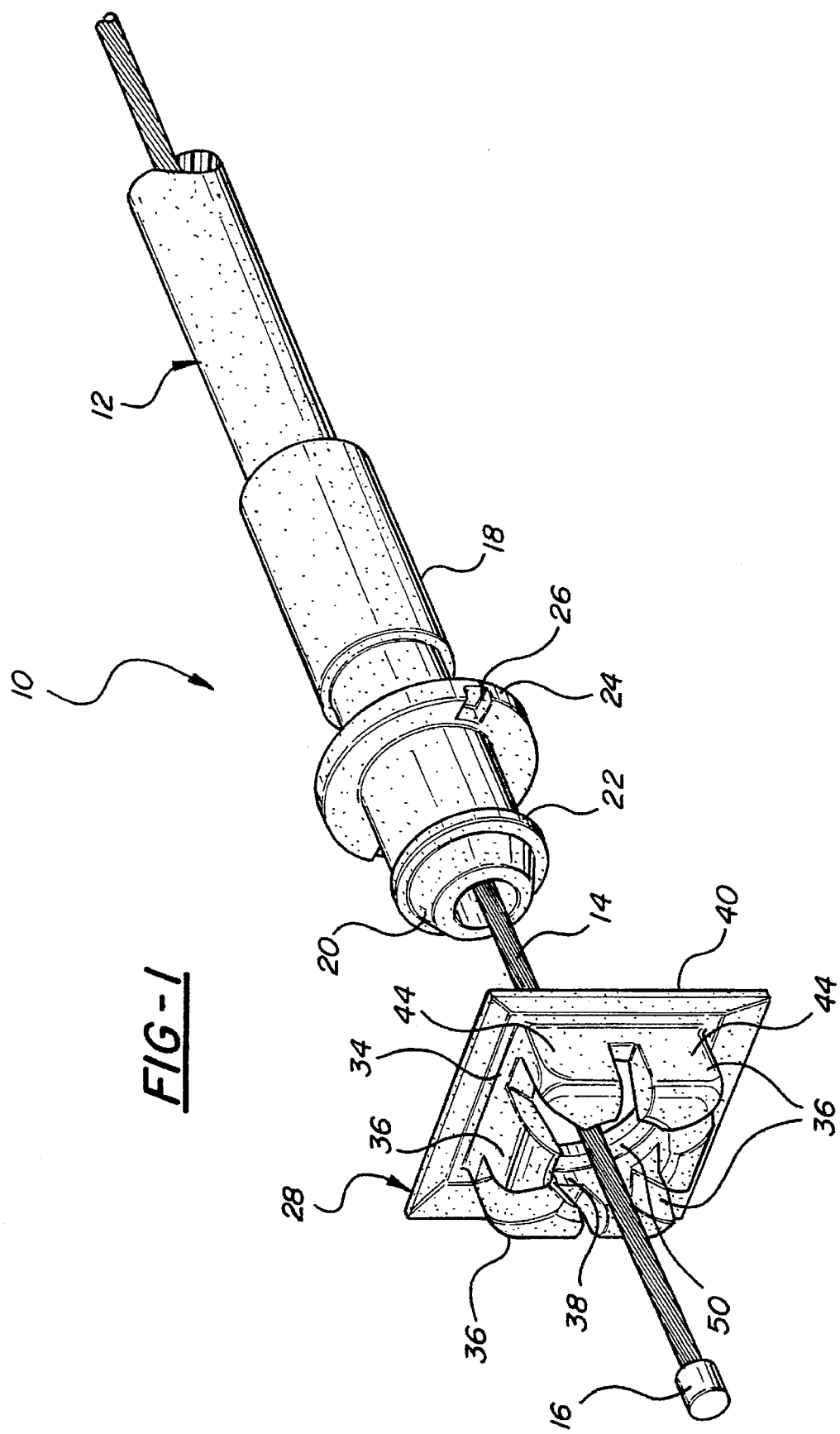
FIG. 1 is a perspective view showing an expandable retainer of the subject invention completely disconnected from an end fitting.

An end fitting 18 is disposed on one of the ends of the conduit 12 by any known means, such as by overmolding, crimping, gluing or the like. Preferably, the end fitting 18 is made entirely of moldable plastic. As perhaps best shown in FIGS. 2 and 3, the end fitting 18 defines a central axis which coincides with the axis established by both the conduit 12 and the core element 14 in that region. In the preferred embodiment disclosed in the figures, the end fitting 18 is overmolded about the prepared end of the conduit 12. The end fitting 18 includes an expander tip 20 which, in the embodiment illustrated in FIGS. 1 through 3, comprises a frustoconical surface. A ring-like external tip rib 22 is disposed about the base of the expander tip 20, and comprises a band of thickened material having a generally squared profile. A stop flange 24 is spaced axially from the expander tip 20. The stop flange 24 is substantially larger, in both axial dimension and in radial extent, than the tip rib 22 at the base of the expander tip 20. The stop flange 24 may include a pair of diametrically opposed pry recesses 26 to facilitate disconnection of the assembly 10, as will be described in greater detail subsequently.

Figures 4, 5:
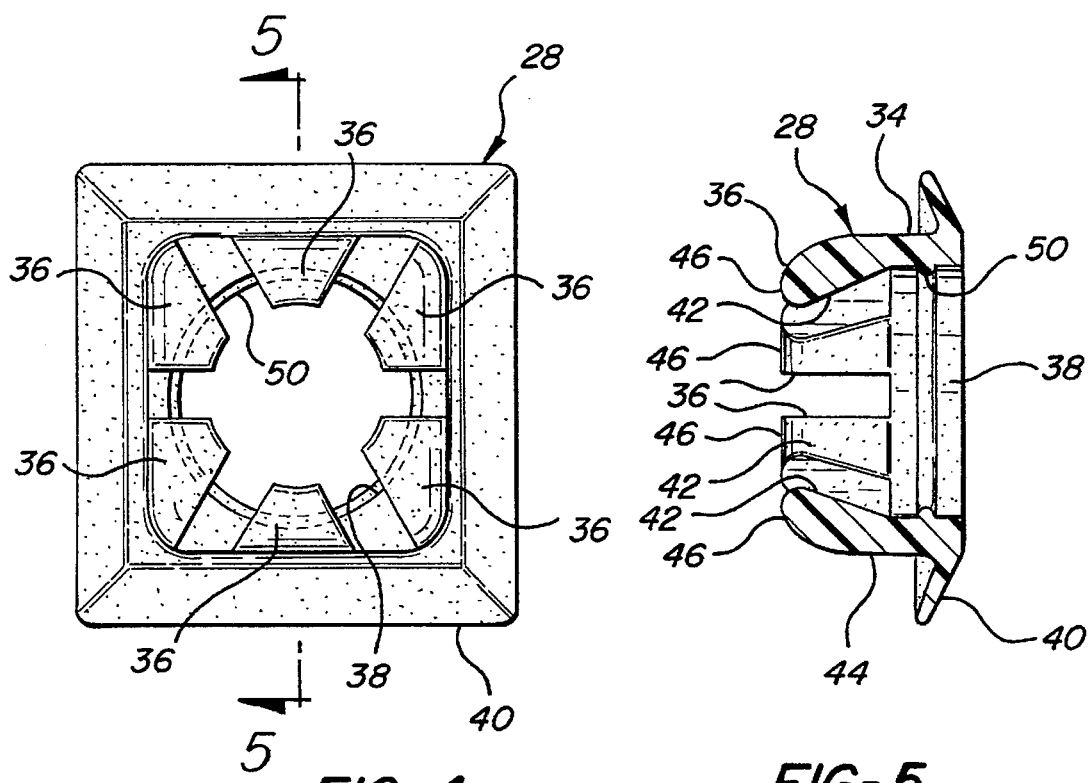
FIG. 4 is an end view of the expandable retainer.
FIG. 5 is a cross-sectional view as taken along lines 5—5 in FIG. 4.

An expandable retainer, generally indicated at 28, is provided for attaching the end fitting 18 to a hole 30 in a thin-walled support bracket 32. The retainer 28 includes a collar 34 surrounding the end fitting 18, and a plurality of cantilever legs 36 extending from the collar 34. In the preferred embodiment shown in the figures, there are provided six legs 36. However, those skilled in the art will readily appreciate that a greater or fewer number of legs 36 can be implemented to achieve the same result. The collar 34 comprises a connecting ring, or band of material from which the legs 36 extend in crenelated fashion. Preferably, the collar 34 has a circular inner opening 38 which is slightly larger than the diameter of the tip rib 22. The collar 34 includes a flexible outer lip 40 which provides a seal against the face of the support bracket 32, around the hole 30. As shown in FIG. 4, the lip 40 may have a generally square peripheral configuration, however, those skilled in the art will readily appreciate that any geometric configuration of the lip 40, which covers the hole 30 would be acceptable. In the preferred embodiment, the hole 30 and the support bracket 32 is square, which necessitates a generally square peripheral configuration of the collar 34, and hence a square-shaped lip 40. However, circular holes 30 and other shapes can also be accommodated by simply changing the outside geometric configuration of the collar 34.

Figure 2:
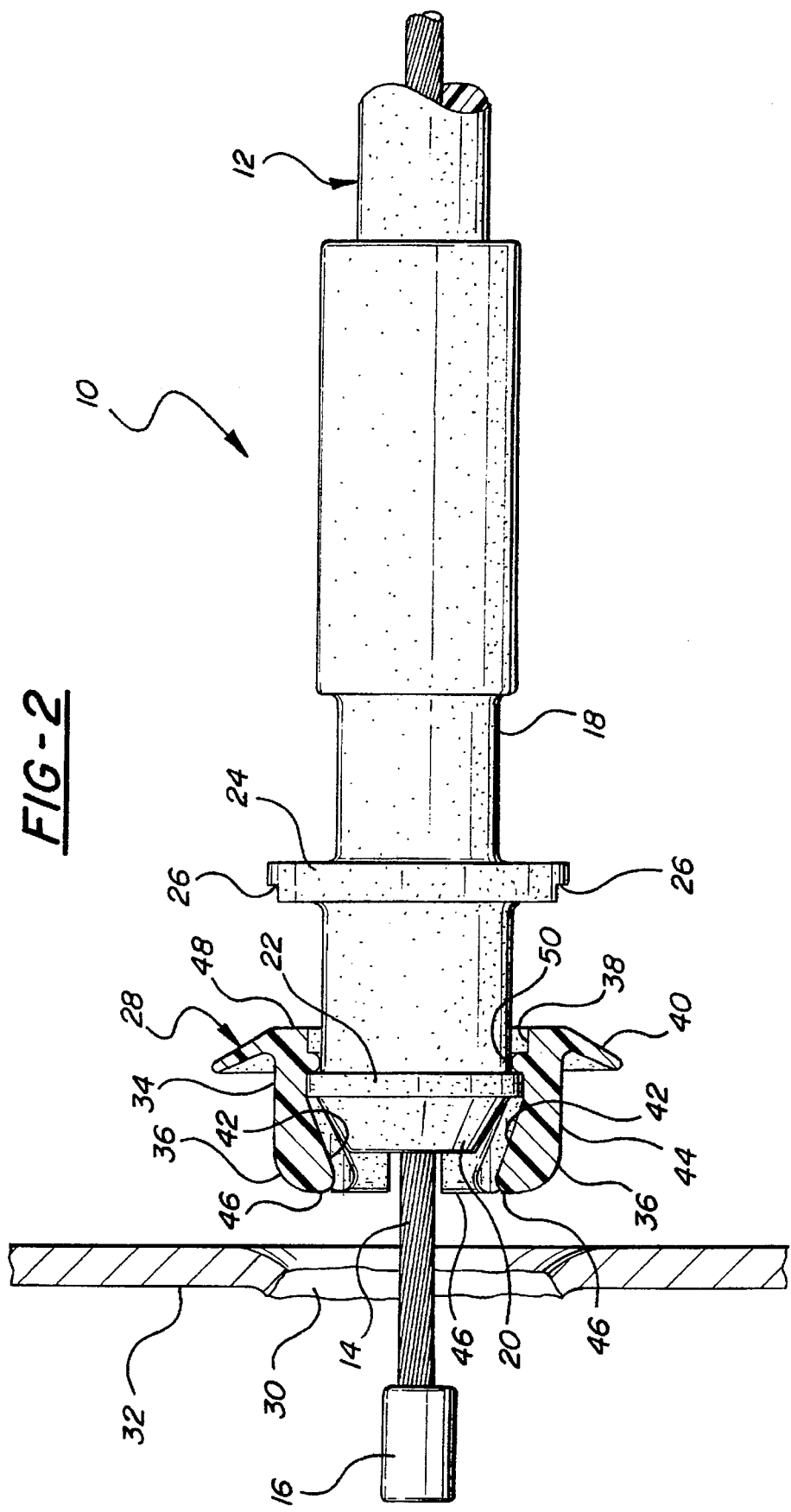
FIG. 2 is a partial cross-sectional view showing the retainer coupled to the end fitting in an unspread preoperative position ready for subsequent attachment to a hole in a support bracket.
Figure 3:
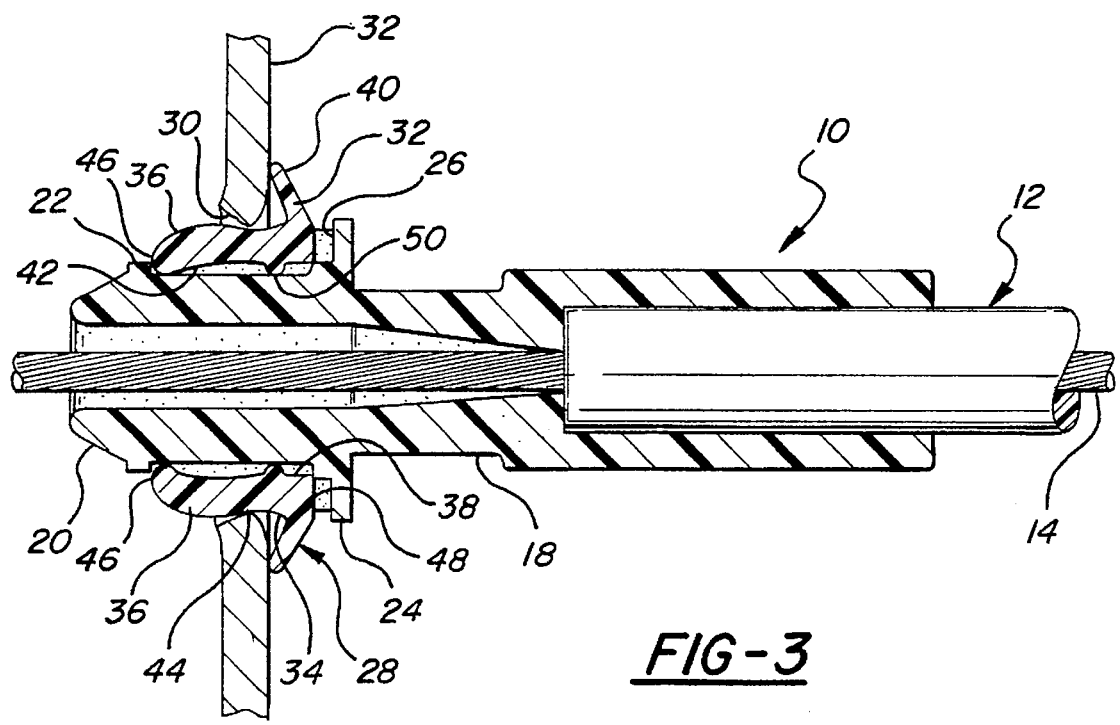
FIG. 3 is a cross-sectional view as in FIG. 2 showing the end fitting forcibly advanced through the retainer in the hole in the support bracket.

The legs 36 extend flexibly from the collar 34, yet the flexibility is designed to be fairly stiff. Each leg 36 includes an inwardly tapering wedge surface 42, extending from the opening 38 of the collar 34, for reactively spreading the leg 36 into gripping engagement with the hole 30 in the support bracket 32 in response to forcible advancement of the end fitting 18 together with the retainer 28 into the hole 30 in the support bracket 32. That is, as the end fitting 18 and retainer 28 are advanced into the hole 30. The lip 40 on the retainer 28 will come to bear against the support bracket 32, arresting further movement of the retainer 28. However, continued force on the end fitting 18 causes the expander tip 20 to pass completely through the opening 38 in the collar, and the advancing tip rib 22 contacts and spreads each of the legs 30 due to their internal wedge surfaces 42. This, in turn, causes the external, gripping surfaces 44 of the legs 36 to blossom outwardly and bear into the edges of the hole 30 of the support bracket 32. Because holes in support brackets, are usually stamped or punched in a manufacturing operation, the edges surrounding the hole typically have a deformity in the direction of the punch travel. As shown in FIGS. 2 and 3, the deformity of the material edges surrounding the hole 30 in the support bracket 32 bend in the same direction in which the end fitting 18 and retainer 28 are inserted into the hole 30. However, it is quite possible that the end fitting 18 and retainer 28 may be inserted through the hole 30 in the opposite direction, i.e., from the left as viewed in both FIGS. 2 and 3. In these instances, the gripping surfaces 44 of the legs 36 are brought into gripping engagement with the support bracket 32 with the same tenacity and effectiveness as when inserted in the direction shown in FIGS. 2 and 3.

Each leg 36 terminates at a distal end 46 which may be rounded slightly. Preferably, the stop flange 24 of the end fitting 18 is spaced from the tip rib 22 an axial distance which is just slightly greater than the axial distance between the distal ends 46 of the legs 36 and the end 48 of the collar 34. This is done so that, at full insertion and expansion of the retainer 28, as shown in FIG. 3, the end 48 of the collar 34 engages the stop flange 24, with the distal ends 46 of the legs 36 seating behind the tip rib 22 to lock the retainer 28 in place on the end fitting 18. That is, the retainer 28 is fully expanded into the hole 30 and the support bracket 32, and is at the same time held trapped in position on the end fitting 18, between the tip rib 22 and the stop flange 24. In this manner, the conduit 12 and its attached end fitting 18 are firmly held in a fixed position relative to the support bracket 32, which permits use of the assembly 10 in medium to high load applications. If, after the retainer 28 is fully expanded into the hole 30, it becomes necessary to disconnect from the support bracket 32, a screw driver blade or other prying instrument can be inserted into one of the pry recesses 26 to assist the disassembly process.

A coupling means is provided for attaching the retainer 28 to the end fitting 18 in an unspread, preoperative position (FIG. 2) ready for subsequent expansion and attachment to the hole 30 in the support bracket 32, thereby preventing inadvertent disconnection and loss of the retainer 28 and decreasing installation time of the remote control assembly 10. The coupling means provides convenient attachment of the retainer 28 to the end fitting 18 so that an assembly line worker will not accidentally lose or drop the retainer 28 prior to connection with the support bracket 32. The coupling means includes an internal retainer rib 50 disposed within the opening 38 in the collar 34 for engaging the tip rib 22 when the retainer 28 and the end fitting 18 are in the unspread preoperative position. Preferably, the retainer rib 50 has a semicircular profile in cross-section. However, other profiles are possible, including a flexible barb which provides little resistance to passage from one direction over the tip rib 22, but substantial resistance to disconnection therefrom. Also, those skilled in the art will appreciate that the retainer rib 50 could be positioned in other locations, such as internally of the legs 36, on the wedge surface 42, or otherwise. The coupling means provides an effective and simple method for coupling the expandable retainer 28 and the end fitting 18 prior to connection with the hole 30 of the thin-walled support bracket 32. Furthermore, this particular combination of structural features provides an extremely secure connection with the support bracket 32, thereby permitting use of the assembly 10 in medium to heavy load applications, as well as providing convenient serviceability by disconnection of the expandable retainer 28 if necessary without damage to the retainer 28.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A motion transmitting remote control assembly (10) for transmitting motion along a curved path, said assembly (10) comprising:

a flexible conduit (12) having a pair of spaced apart ends;

an end fitting (18) disposed on one of said ends of said conduit (12) and defining a central axis, said end fitting (18) including an expander tip (20);

a flexible core element (14) slidably disposed in said conduit (12);

an expandable retainer (28) for attaching said end fitting (18) to a hole (30) in a thin-walled support bracket (32), said retainer (28) having a collar (34) surrounding said end fitting (18) and a plurality of cantilever legs (36) extending from said collar (34), said legs (36) each including an inwardly tapering wedge surface (42) for reactively spreading said legs (36) into gripping engagement with the hole (30) in the support bracket (32) in response to forcible advancement of said end fitting (18) and said retainer (28) into the hole (30) in the support bracket (32);

coupling means for attaching said retainer (28) to said end fitting (18) in an unspread preoperative position ready for subsequent expansion and attachment to the hole (30) in the support bracket (32) thereby preventing inadvertent disconnection and loss of said retainer (28) and decreasing installation time of said remote control assembly (10)

and characterized by including an external tip rib (22) disposed about said expander tip (20) of said end fitting (18) and an internal retainer rib (50) disposed within said retainer (28) and engageable with said tip rib (22) when said retainer (28) and said end fitting (18) are in said unspread preoperative position;

said end fitting (18) including a stop flange (24) spaced axially from said expander tip (20) and engageable with said collar (34) when said legs (36) are fully spread.

2. An assembly (10) as set forth in claim 1 wherein each of said legs (36) includes a distal end (46) spaced from said collar (34).

3. An assembly (10) as set forth in claim 2 wherein the axial distance between said stop flange (24) and said tip rib (22) is slightly greater than the distance between said collar (34) and said distal ends (46) of said legs (36) to allow said distal ends of said legs (36) to seat behind said tip rib (22) when said legs (36) are fully spread.

4. An assembly (10) as set forth in claim 3 wherein said distal ends of said legs (36) are rounded.

5. An assembly (10) as set forth in claim 1 wherein said stop flange (24) includes a pry recess (26).

6. An assembly (10) as set forth in claim 1 wherein said collar (34) includes a flexible lip (40).

7. An assembly (10) as set forth in claim 1 wherein said collar (34) has a generally square peripheral configuration.

8. An assembly (10) as set forth in claim 1 wherein said plurality of legs (36) consists of six legs (36).

9. An assembly (10) as set forth in claim 1 wherein said retainer rib (50) has a semicircular profile.

10. An assembly (10) as set forth in claim 1 wherein said tip rib (22) has a squared profile.

11. A motion transmitting remote control assembly (10) for transmitting motion along a curved path, said assembly (10) comprising:

a flexible conduit (12) having a pair of spaced apart ends;

an end fitting (18) disposed on one of said ends of said conduit (12) and defining a central axis, said end fitting (18) including an expander tip (20) and a stop flange (24) spaced axially from said expander tip (20);

a flexible core element (14) slidably disposed in said conduit (12);

an expandable retainer (28) for attaching said end fitting (18) to a hole (30) in a thin-walled support bracket (32), said retainer (28) having a collar (34) surrounding said end fitting (18) and a plurality of cantilever legs (36) extending from said collar (34), said legs (36) each including an inwardly tapering wedge surface (42) for reactively spreading said legs (36) into gripping engagement with the hole (30) in the support bracket (32) in response to forcible advancement of said end fitting (18) and said retainer (28) into the hole (30) in the support bracket (32), each of said legs (36) including a distal end (46) spaced from said collar (34);

and characterized by an external tip rib (22) disposed about said expander tip (20) of said end fitting (18) and an internal retainer rib (50) disposed within said retainer (28) and engageable with said tip rib (22) when said retainer (28) and said end fitting (18) are in an unspread preoperative position for attaching said retainer (28) to said end fitting (18) in said unspread preoperative position ready for subsequent expansion and attachment to the hole (30) in the support bracket (32) thereby preventing inadvertent disconnection and loss of said retainer (28) and decreasing installation time of said remote control assembly (10), said distal ends (46) of said legs (36) seatable behind said tip rib (22) when said legs (36) are fully spread;

said stop flange (24) engageable with said collar (34) when said legs (36) are fully spread.

* * * * *